(12) United States Patent
Gruber et al.

(10) Patent No.: US 11,475,533 B2
(45) Date of Patent: Oct. 18, 2022

(54) GPR OPTIMIZATION IN A GPU BASED ON A GPR RELEASE MECHANISM

(71) Applicant: QUALCOMM Incorporated, San Diego, CA (US)

(72) Inventors: Andrew Evan Gruber, Arlington, MA (US); Yun Du, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 16/877,367

(22) Filed: May 18, 2020

(65) Prior Publication Data

US 2021/0358076 A1    Nov. 18, 2021

(51) Int. Cl.
| | | |
|---|---|---|
| *G06T 15/50* | (2011.01) | |
| *G06T 1/60* | (2006.01) | |
| *G06F 9/30* | (2018.01) | |
| *G06T 1/20* | (2006.01) | |

(52) U.S. Cl.
CPC ............ *G06T 1/60* (2013.01); *G06F 9/30098* (2013.01); *G06T 1/20* (2013.01)

(58) Field of Classification Search
CPC ......... G06T 15/005; G06T 15/80; G06T 1/60; G06T 2200/28; G06F 9/30098; G06F 9/3012; G06F 9/30127; G06F 9/384; G06F 9/5011; G06F 9/5016
See application file for complete search history.

(56) References Cited

U.S. PATENT DOCUMENTS

| | | | | |
|---|---|---|---|---|
| 2014/0118375 A1* | 5/2014 | Abdalla | .................... | G06T 1/20 345/545 |
| 2017/0371654 A1 | 12/2017 | Bajic et al. | | |
| 2018/0232846 A1* | 8/2018 | Gruber | ...................... | G06T 1/60 |
| 2018/0232936 A1 | 8/2018 | Nevraev et al. | | |

FOREIGN PATENT DOCUMENTS

EP    2289050 A2    3/2011

OTHER PUBLICATIONS

International Search Report and Written Opinion—PCT/US2021/027337—ISA/EPO—dated Aug. 6, 2021.

* cited by examiner

*Primary Examiner* — Hau H Nguyen
(74) *Attorney, Agent, or Firm* — Procopio, Cory, Hargreaves & Savitch

(57) ABSTRACT

This disclosure provides systems, devices, apparatus and methods, including computer programs encoded on storage media, for GPR optimization in a GPU based on a GPR release mechanism. More specifically, a GPU may determine at least one unutilized branch within an executable shader based on constants defined for the executable shader. Based on the at least one unutilized branch, the GPU may further determine a number of GPRs that can be deallocated from previously allocated GPRs. The GPU may deallocate, for a subsequent thread within a draw call, the number of GPRs from the previously allocated GPRs during execution of the executable shader based on the determined number of GPRs to be deallocated.

20 Claims, 6 Drawing Sheets

GPR OPTIMIZATION IN A GPU BASED ON A GPR RELEASE MECHANISM

BACKGROUND

Technical Field

The present disclosure relates generally to processing systems, and more particularly, to register optimization in graphics processing using a release mechanism.

Introduction

Computing devices often perform graphics processing (e.g., utilizing a graphics processing unit (GPU)) to render graphical data for display by the computing devices. Such computing devices may include, for example, computer workstations, mobile phones such as smartphones, embedded systems, personal computers, tablet computers, and video game consoles. GPUs are configured to execute a graphics processing pipeline that includes one or more processing stages that operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A device that provides content for visual presentation on a display may utilize a GPU.

General purpose registers (GPRs) may be allocated to a program executing on the GPU to temporarily store information. However, as more GPRs are allocated to the program, a fewer number of threads may be simultaneously resident in the GPU. Accordingly, there is a need for decreasing a number of GPRs allocated to the program.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

GPRs may be variably allocated to a shader program following shader compilation based on a number of possible branches within the compiled shader. More specifically, a compiler may determine at a compile time that a variable of the shader may be constant throughout a duration of a draw call, even though an exact value of that variable may be undetermined by the compiler at the compile time. As such, the number of possible branches within the compiled shader may be determined based on different values that the constant may assume at runtime of the shader. As a result, an overabundance of GPRs may be allocated to the shader at compile time to ensure that the shader has enough GPRs to execute even the most complex branch of the shader, regardless of whether such branch will actually be executed.

Accordingly, a programmable GPR release mechanism may be utilized to deallocate excess GPRs allocated to the shader at compile time. The release mechanism may be executed at a runtime of the shader after a value of the constants is determined by the shader. With more specificity, for example, a shader may be compiled with a complex branch that requires more GPRs for execution and a simpler branch that requires fewer GPRs for execution. Based on the value that is defined for the constants, the shader may determine that the complex branch will not be executed during a draw call and that some of the GPRs allocated to the shader at compile time are in excess of that which are needed for execution of the simpler branch. Thus, the release mechanism may be configured to deallocate the excess/ unneeded GPRs from subsequent shader threads so that more of the subsequent threads may be simultaneously resident in the GPU.

In an aspect of the disclosure, a method, a computer-readable medium, and an apparatus are provided. The apparatus may include a memory and at least one processor coupled to the memory. The at least one processor may be configured to determine at least one unutilized branch within an executable shader based on constants defined for the executable shader, and further determine a number of GPRs that can be deallocated from allocated GPRs based on the at least one unutilized branch. The at least one processor may deallocate the number of GPRs from the allocated GPRs during execution of the executable shader within a draw call based on the determined number of GPRs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
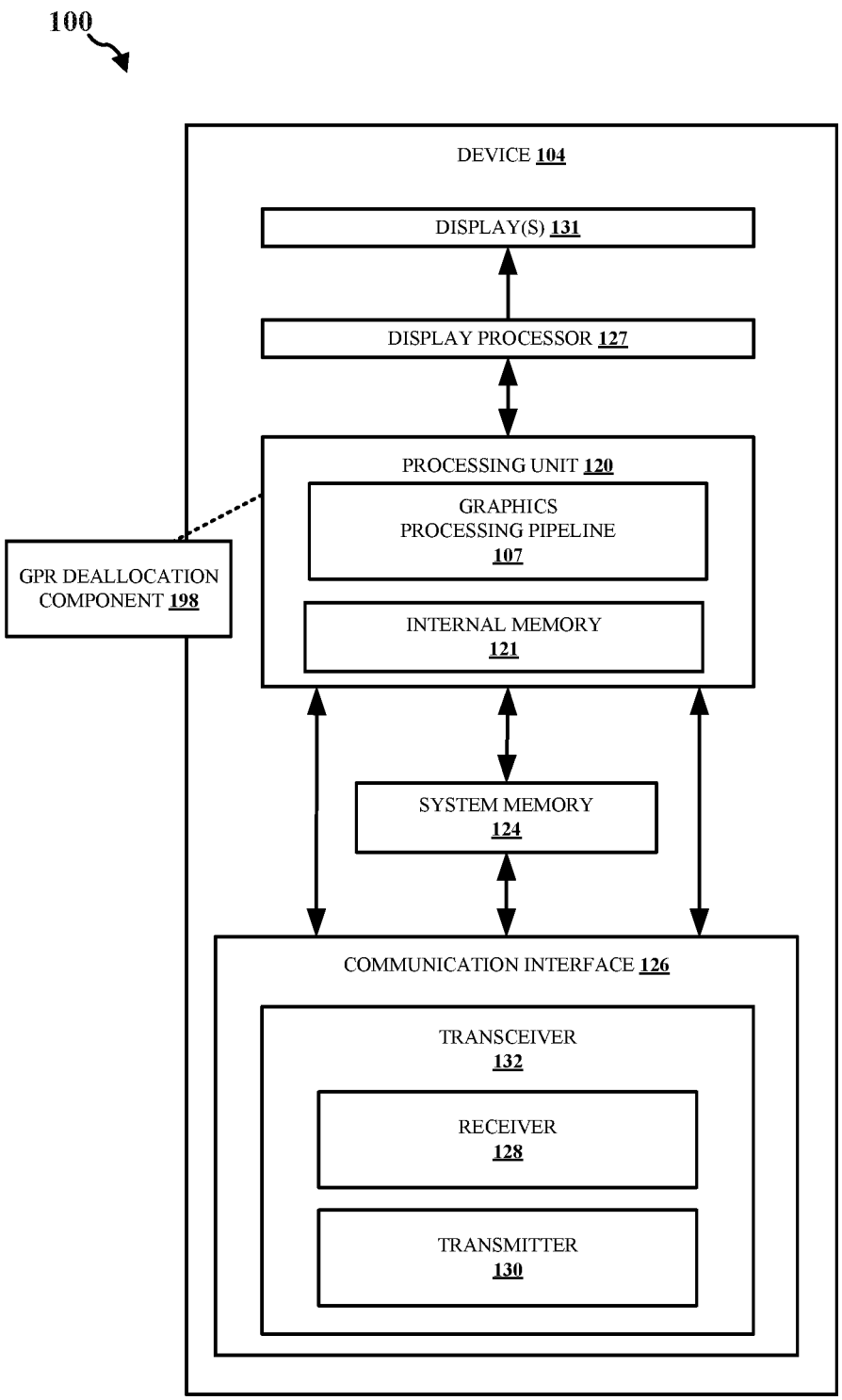
FIG. 1 is a block diagram that illustrates an exemplary content generation system in accordance with one or more techniques of this disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods.

These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOCs), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

The term application may refer to software. As described herein, one or more techniques may refer to an application (e.g., software) being configured to perform one or more functions. In such examples, the application may be stored in a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for graphics processing in a single device or multiple devices that may improve the rendering of graphical content and/or reduce the load of a processing unit (e.g., any processing unit configured to perform one or more techniques described herein, such as a GPU). For example, this disclosure describes techniques applicable to graphics processing in any device that utilizes a graphics processor. Other potential advantages of such techniques are described throughout this disclosure.

As used herein, instances of the term "content" may refer to "graphical content," an "image," etc., regardless of whether the terms are used as an adjective, noun, or other parts of speech. In some examples, the term "graphical content," as used herein, may refer to a content produced by one or more processes of a graphics processing pipeline. In further examples, the term "graphical content," as used herein, may refer to a content produced by a processing unit configured to perform graphics processing. In still further examples, as used herein, the term "graphical content" may refer to a content produced by a graphics processing unit.

GPRs may be variably allocated to a shader program following shader compilation based on a number of possible branches within the compiled shader. More specifically, a compiler may determine at a compile time that a variable of the shader may be constant throughout a duration of a draw call, even though an exact value of that variable may be undetermined by the compiler at the compile time. As such, the number of possible branches within the compiled shader may be determined based on different values that the constant may assume at runtime of the shader. As a result, an overabundance of GPRs may be allocated to the shader at compile time to ensure that the shader has enough GPRs to execute even the most complex branch of the shader, regardless of whether such branch will actually be executed.

Accordingly, a programmable GPR release mechanism may be utilized to deallocate excess GPRs allocated to the shader at compile time. The release mechanism may be executed at a runtime of the shader after a value of the constants is determined by the shader. With more specificity, for example, a shader may be compiled with a complex branch that requires more GPRs for execution and a simpler branch that requires fewer GPRs for execution. Based on the value that is defined for the constants, the shader may determine that the complex branch will not be executed during a draw call and that some of the GPRs allocated to the shader at compile time are in excess of that which are needed for execution of the simpler branch. Thus, the release mechanism may be configured to deallocate the excess/unneeded GPRs from the shader so that the excess GPRs may be allocated to subsequent threads in the GPU, allowing more of the subsequent threads to be simultaneously resident in the GPU.

FIG. 1 is a block diagram that illustrates an example content generation system 100 configured to implement one or more techniques of this disclosure. The content generation system 100 includes a device 104, which may be, but is not limited to, a video device (e.g., media player), set-top box, wireless communication device (e.g., smartphone), personal digital assistant (PDAs), desktop/laptop computer, gaming console, video conferencing unit, tablet computing device, and the like. The device 104 may include one or more components or circuits for performing various functions described herein. In some examples, one or more components of the device 104 may be components of a SOC. The device 104 may include one or more components configured to perform one or more techniques of this disclosure. In the example shown, the device 104 may include a processing unit 120, and a system memory 124. In some aspects, the device 104 may include a number of optional components (e.g., a communication interface 126, a transceiver 132, a receiver 128, a transmitter 130, a display processor 127, and one or more displays 131). Display(s) 131 may refer to one or more displays 131. For example, the display 131 may include a single display or multiple displays, which may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing using a graphics processing pipeline 107. In some examples, the device 104 may include a display processor, such as the display processor 127, to perform one or more display processing techniques on one or more frames generated by the processing unit 120 before being displayed by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of a liquid crystal display (LCD), a plasma display, an organic light emitting diode (OLED) display, a projection display device, an augmented reality display device, a virtual reality display device, a head-mounted display, or any other type of display device.

Memory external to the processing unit 120, such as system memory 124, may be accessible to the processing unit 120. For example, the processing unit 120 may be configured to read from and/or write to external memory, such as the system memory 124. The processing unit 120 may be communicatively coupled to the system memory 124 over a bus. In some examples, the processing unit 120 may be communicatively coupled to the internal memory 121 over the bus or via a different connection. The internal memory 121 or the system memory 124 may include one or more volatile or non-volatile memories or storage devices. In some examples, internal memory 121 or the system memory 124 may include RAM, static random access memory (SRAM), dynamic random access memory (DRAM), erasable programmable ROM (EPROM), EEPROM, flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a CPU, a GPU, GPGPU, or any other processing unit that may be configured to perform graphics processing. In some examples, the processing unit 120 may be integrated into a motherboard of the device 104. In further examples, the processing unit 120 may be present on a graphics card that is installed in a port of the motherboard of the device 104, or may be otherwise incorporated within a peripheral device configured to interoperate with the device 104. The processing unit 120 may include one or more processors, such as one or more microprocessors, GPUs, ASICs, FPGAs, arithmetic logic units (ALUs), DSPs, discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the graphics processing unit 120 may include a GPR deallocation component 198 configured to determine at least one unutilized branch within an executable shader based on constants defined for the executable shader; determine a number of GPRs that can be deallocated from allocated GPRs based on the at least one unutilized branch; and deallocate, for a subsequent thread within a draw call, the number of GPRs from the allocated GPRs during execution of the executable shader based on the determined number of GPRs. Depiction and reference to the deallocation component 198 as a "component" is for ease of explanation and does not necessarily correspond to a specific hardware component in the processing unit 120. For example, the deallocation component 198 may be configured as code, logic, etc.

A device, such as the device 104, may refer to any device, apparatus, or system configured to perform one or more techniques described herein. For example, a device may be a server, a base station, a user equipment, a client device, a station, an access point, a computer such as a personal computer, a desktop computer, a laptop computer, a tablet computer, a computer workstation, or a mainframe computer, an end product, an apparatus, a phone, a smart phone, a server, a video game platform or console, a handheld device such as a portable video game device or a personal digital assistant (PDA), a wearable computing device such as a smart watch, an augmented reality device, or a virtual reality device, a non-wearable device, a display or display device, a television, a television set-top box, an intermediate network device, a digital media player, a video streaming device, a content streaming device, an in-vehicle computer, any mobile device, any device configured to generate graphical content, or any device configured to perform one or more techniques described herein. Processes herein may be described as performed by a particular component (e.g., a GPU) but in other embodiments, may be performed using other components (e.g., a CPU) consistent with the disclosed embodiments.

Figure 2:
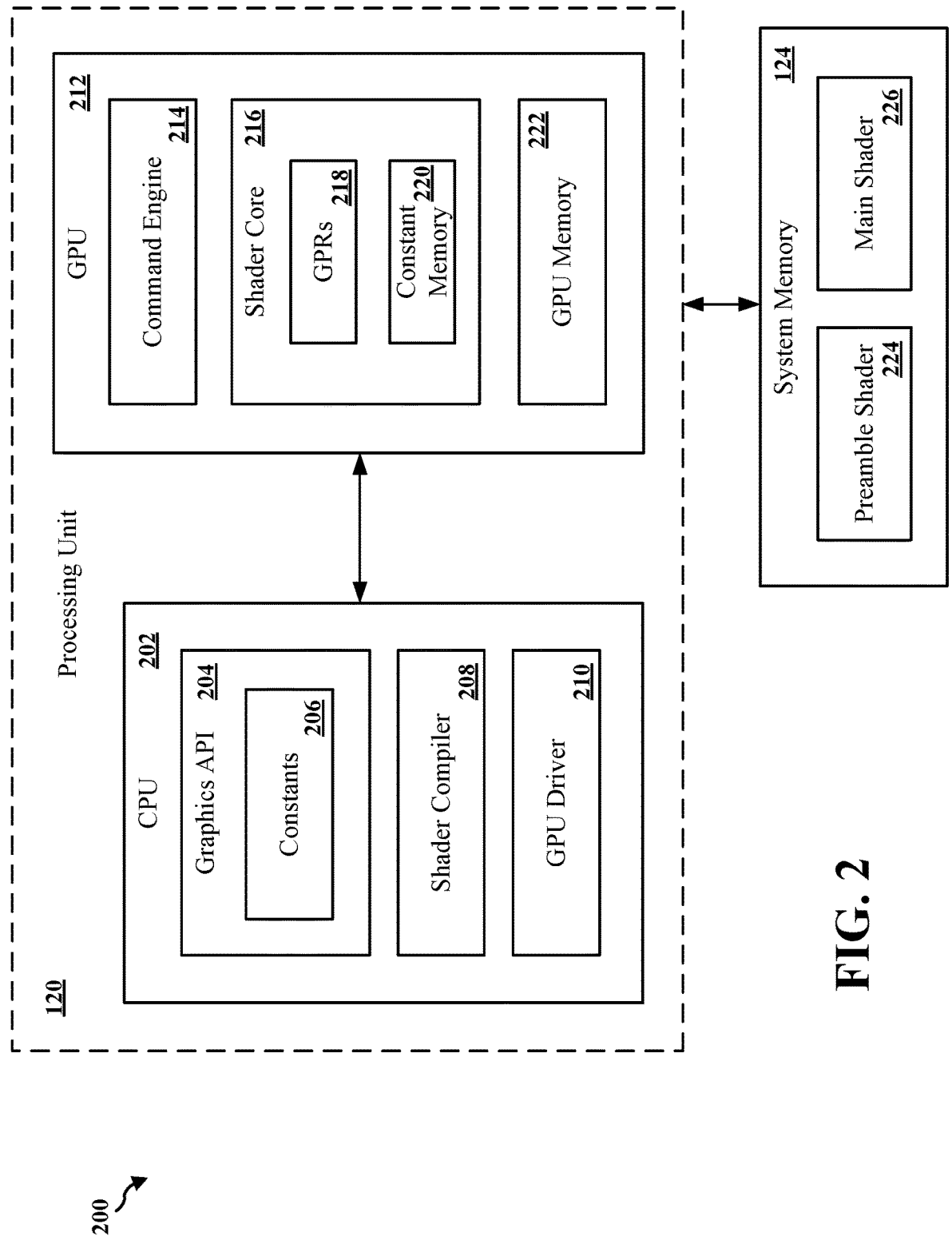
FIG. 2 is a block diagram that illustrates exemplary components for processing data in accordance with one or more techniques of this disclosure.

FIG. 2 is a block diagram 200 that illustrates exemplary components, such as the processing unit 120 and the system memory 124, as may be identified in connection with the exemplary device 104 for processing data. In aspects, the processing unit 120 may include a CPU 202 and a GPU 212. The GPU 212 and the CPU 202 may be formed as an integrated circuit (e.g., a SOC) and/or the GPU 212 may be incorporated onto a motherboard with the CPU 202. Alternatively, the CPU 202 and the GPU 212 may be configured as distinct processing units that are communicatively coupled to each other. For example, the GPU 212 may be incorporated on a graphics card that is installed in a port of the motherboard that includes the CPU 202.

The CPU 202 may be configured to execute a software application that causes graphical content to be displayed (e.g., on the display(s) 131 of the device 104) based on one or more operations of the GPU 212. The software application may issue instructions to a graphics application program interface (API) 204, which may be a runtime program that translates instructions received from the software application into a format that is readable by a GPU driver 210. After receiving instructions from the software application via the graphics API 204, the GPU driver 210 may control an operation of the GPU 212 based on the instructions. For example, the GPU driver 210 may generate one or more command streams that are placed into the system memory 124, where the GPU 212 is instructed to execute the command streams (e.g., via one or more system calls). A command engine 214 included in the GPU 212 is configured to retrieve the one or more commands stored in the command streams. The command engine 214 may provide commands from the command stream for execution by the GPU 212. The command engine 214 may be hardware of the GPU 212, software/firmware executing on the GPU 212, or a combination thereof.

While the GPU driver 210 is configured to implement the graphics API 204, the GPU driver 210 is not limited to being configured in accordance with any particular API. The system memory 124 may store the code for the GPU driver 210, which the CPU 202 may retrieve for execution. In examples, the GPU driver 210 may be configured to allow communication between the CPU 202 and the GPU 212, such as when the CPU 202 offloads graphics or non-graphics processing tasks to the GPU 212 via the GPU driver 210.

The system memory 124 may further store source code for one or more of a preamble shader 224 or a main shader 226. In such configurations, a shader compiler 208 executing on the CPU 202 may compile the source code of the shaders 224-226 to create object code or intermediate code executable by a shader core 216 of the GPU 212 during runtime (e.g., at the time when the shaders 224-226 are to be executed on the shader core 216). In some examples, the shader compiler 208 may pre-compile the shaders 224-226 and store the object code or intermediate code of the shader programs in the system memory 124.

The shader compiler 208 (or in another example the GPU driver 210) executing on the CPU 202 may build a shader program with multiple components including the preamble shader 224 and the main shader 226. The main shader 226 may correspond to a portion or the entirety of the shader program that does not include the preamble shader 224. The shader compiler 208 may receive instructions to compile the shader(s) 224-226 from a program executing on the CPU 202. The shader compiler 208 may also identify constant load instructions and common operations in the shader program for including the common operations within the preamble shader 224 (rather than the main shader 226). The shader compiler 208 may identify such common instructions, for example, based on (presently undetermined) constants 206 to be included in the common instructions. The constants 206 may be defined within the graphics API 204 to be constant across an entire draw call. The shader compiler 208 may utilize instructions such as a preamble shader start to indicate a beginning of the preamble shader 224 and a preamble shader end to indicate an end of the preamble shader 224. Similar instructions may be used for the main shader 226.

The shader core 216 included in the GPU 212 may include GPRs 218 and constant memory 220. The GPRs 218 may correspond to a single GPR, a GPR file, and/or a GPR bank. Each GPR in the GPRs 218 may store data accessible to a single thread. The software and/or firmware executing on GPU 212 may be a shader program 224-226, which may execute on the shader core 216 of GPU 212. The shader core 216 may be configured to execute many instances of the same instructions of the same shader program in parallel. For example, the shader core 216 may execute the main shader 226 for each pixel that defines a given shape.

The shader core 216 may transmit and receive data from applications executing on the CPU 202. In examples, constants 206 used for execution of the shaders 224-226 may be stored in a constant memory 220 (e.g., a read/write constant RAM) or the GPRs 218. The shader core 216 may load the constants 206 into the constant memory 220. In further examples, execution of the preamble shader 224 may cause a constant value or a set of constant values to be stored in on-chip memory such as the constant memory 220 (e.g., constant RAM), the GPU memory 222, or the system memory 124. The constant memory 220 may include memory accessible by all aspects of the shader core 216 rather than just a particular portion reserved for a particular thread such as values held in the GPRs 218.

Figure 3:
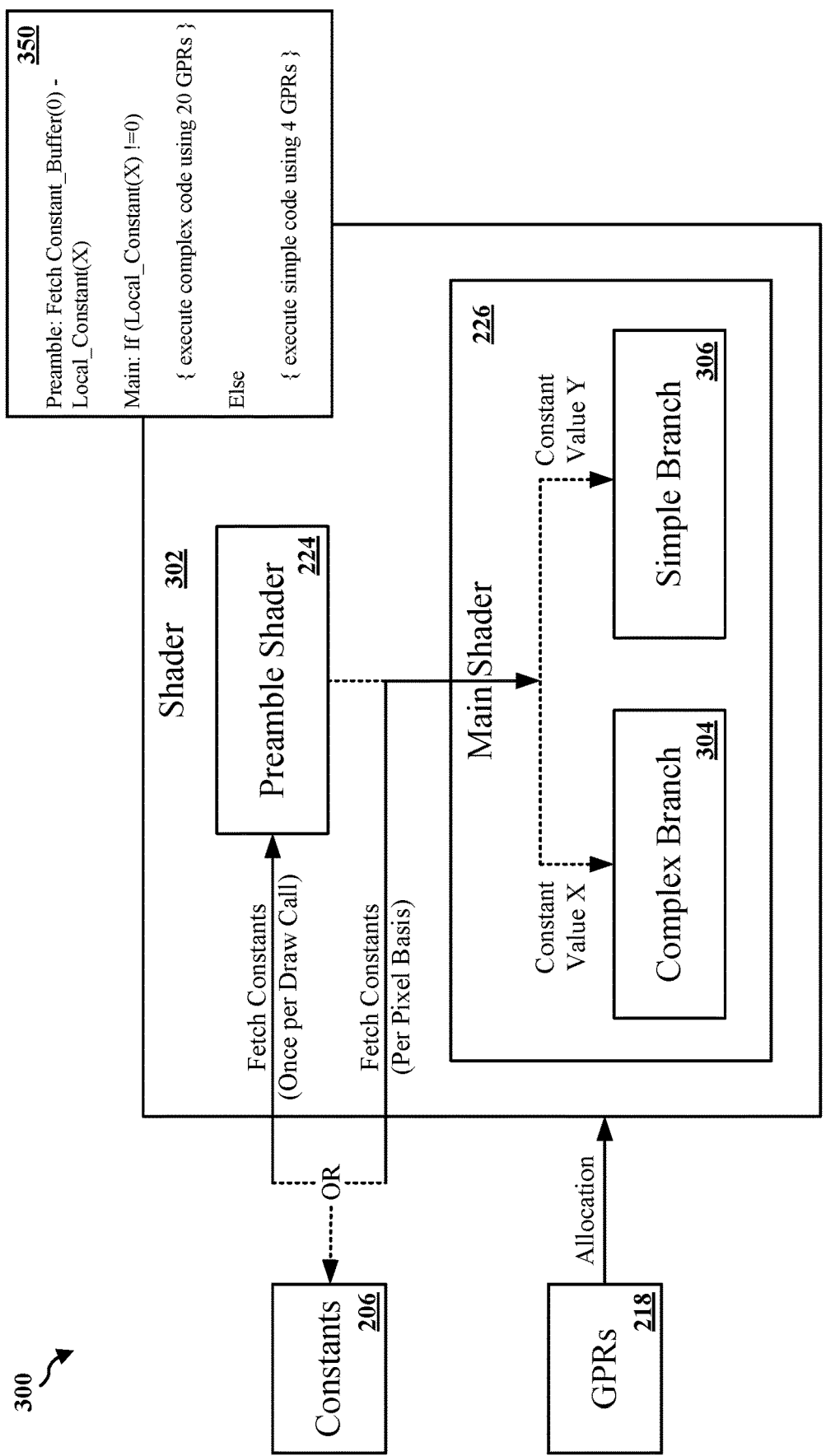
FIG. 3 is a block diagram corresponding to example instructions for executing a shader based on a GPR allocation in accordance with one or more techniques of this disclosure.

FIG. 3 is a block diagram 300 corresponding to example instructions 350 for executing a shader 302 based on a GPR allocation. GPRs may be variably allocated to shaders at a time of shader compilation. However, as a number of GPRs 218 allocated to the shader 302 increases, a corresponding number of threads that can be simultaneously resident in the GPU decreases. Such an effect caused by an increase in the number of allocated GPRs 218 may not only limit latency hiding but may also decrease an overall performance of the GPU. To balance the tradeoff between increasing the number of GPRs 218 allocated to the shader 302 and increasing the number of threads that can be simultaneously resident in the GPU, the shader 302 may be executed based on only a minimum number of GPRs 218 needed for shader execution so that there are no unused allocated GPR resources by the shader 302.

The minimum number of GPRs 218 needed to execute the shader 302 may be based on constant/uniform values that do not change over the runtime of the shader 302 for a single draw call or kernel. Given that an exact value of the constants 206 may not be known by the compiler at the time the shader 302 is compiled, an overabundance of GPRs 218 may be allocated to the shader 302 to ensure sufficient availability of GPRs 218 for executing more complex paths/branches (e.g., the complex branch 304) of the shader 302. If the value of the constants 206 were known at the time the shader 302 is compiled, the compiler may be able to increase shader performance by eliminating certain branches from the shader 302 that require more GPRs 218 for execution and thereby reduce the number of GPRs 218 that need to be allocated to the shader 302 following compilation. Alternatively, if the GPU driver could determine the value of the constants 206 at the time the shader 302 is submitted (e.g., queued) to the GPU, the compiler could generate multiple versions of the shader 302 that each have a different GPR allocation and allow the GPU driver to select the version of the shader 302 that is to be used at submittal time.

In general, the values of constants 206 cannot be determined by the compiler at compile time or by the GPU driver at submittal time. While the compiled shader 302 may be configured to identify the values of the constants 206 at runtime, the number of GPRs 218 may already be allocated to the shader 302 by the time that runtime occurs, perhaps in excess of the number of GPRs 218 needed for executing certain branches of the shader 302. Thus, even though the compiler may be configured to identify that a variable is a constant at compile time, the exact value of that constant 206 may remain unknown during shader compilation such that the constant value cannot be used for reducing the GPR allocation.

A shader may have different flow control paths/branches that are based on some combination of the constants 206. The constants 206 may be defined within the graphics API to remain the same across the entire draw call (e.g., for the entire life of a corresponding shape). That is, a constant 206 of a given value does not change on a per pixel basis from one pixel to the next across the draw call. The constant 206 remains unchanged throughout the shader lifetime for all of the pixels that execute the corresponding shape. Constant buffers, which may also be referred to as uniform buffers, may be managed by the graphics API and reside in memory (e.g., similar to a texture buffer or a frame buffer), where the constant buffers may be accessed by the shader 302 to provide constant/uniform values over the draw call.

An executable shader program may include a preamble portion of the shader program and a main portion of the shader program (or simply a "preamble shader" 224 and a "main shader" 226). The preamble shader 224 may be a portion of the shader 302 that is executed just once per draw call or kernel. The preamble shader 224 may be executed prior to allowing any threads to execute the main shader 226. The preamble shader 224 may also preload constant values into a local memory of the GPU where the constant values may be used by multiple threads executing within the main shader 226. Accordingly, the constant values may be fetched by the preamble shader once per draw call, rather than being fetched by the main shader for each thread (e.g., pixel) within the draw call.

In an example, the preamble shader 224 may fetch a local constant 206 from the local constant buffer. When the local constant 206 has a first value (e.g., constant value X), the main shader 226 may execute a complex branch 304 using a first number of GPRs 218 (e.g., 20 GPRs). When the local constant has a second value (e.g., constant value Y), the main shader 226 may execute a simple branch 306 using a second number of GPRs 218 (e.g., 4 GPRs). However, in cases where the local constant is 0 for the draw call and execution of the complex branch 304 is not needed, the shader 302 may still be executed, for example, based on an allocation of 20 GPRs rather than based on an allocation of 4 GPRs. As a result, some of the GPRs 218 allocated to the shader 302 may be unnecessary/excessive.

Figure 4:
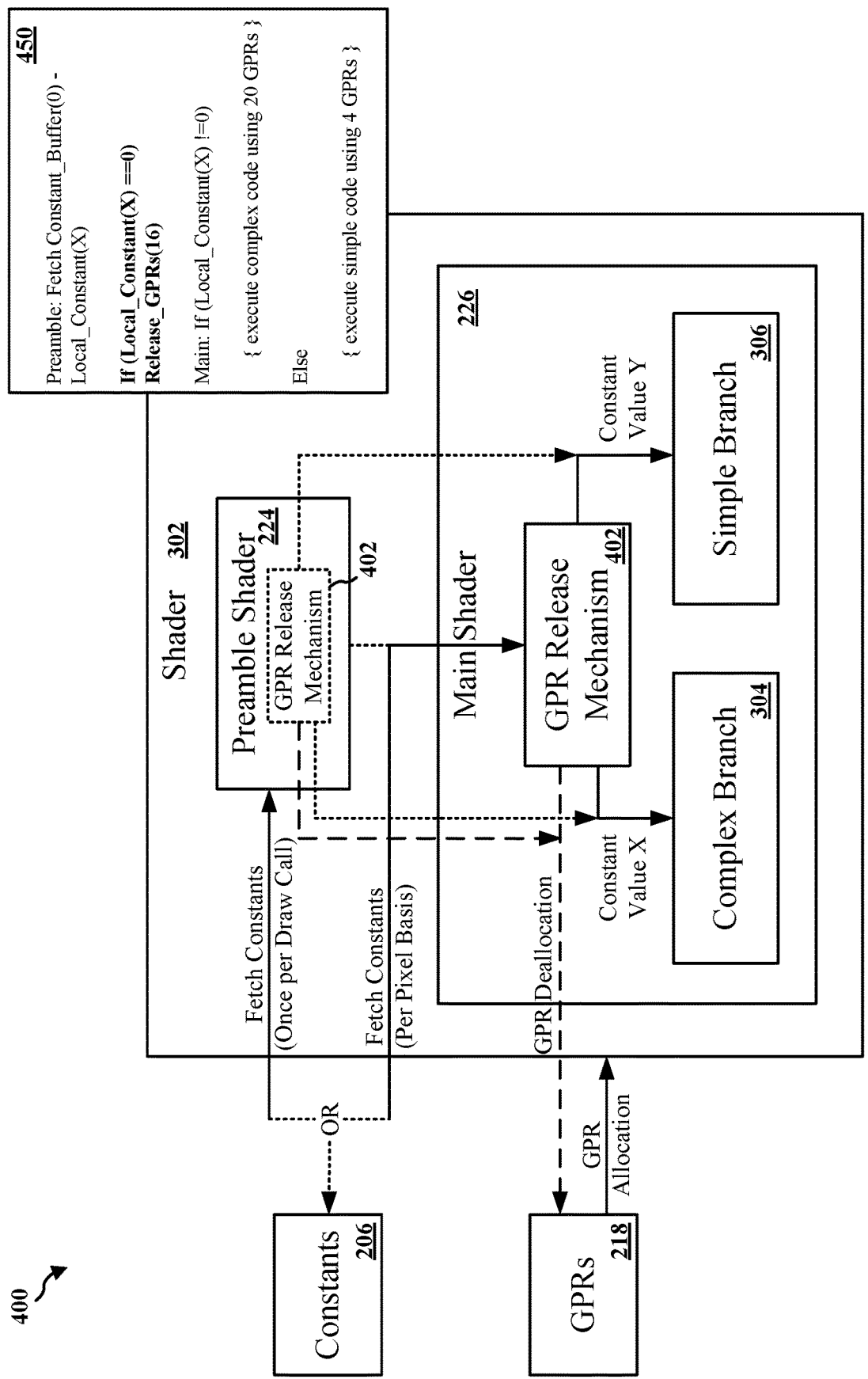
FIG. 4 is a block diagram corresponding to example instructions for executing a shader based on a programmable GPR release mechanism in accordance with one or more techniques of this disclosure.

FIG. 4 is a block diagram 400 corresponding to example instructions 450 for executing a shader 302 based on a programmable GPR release mechanism 402. The GPR release mechanism 402 may be executed at runtime to allow a GPR "footprint" to be modified based on a determination of the local constant value and/or the number of allocated GPRs 218. For example, when the local constant 206 is 0, the shader 302 may be able to execute a simple branch 306 for the draw call (e.g., with 4 GPRs per thread) and may release any excess GPRs 218 (e.g., 16 GPRs may be released) associated with subsequent thread/pixel execution within a draw call. In contrast to the compiler, which may cause GPR allocation to be based on the complex branch 304 since the compiler may not have a way to determine the values of the constants 206 at compile time, the shader 302 may determine after identifying such values of the constants 206 via the GPR release mechanism 402 a number of GPRs 218 that are actually needed for execution of the shader 302 so that any unneeded GPRs 218 may be released/deallocated from the shader 302.

Accordingly, the shader 302 may be executed based on a complex branch 304 that requires a greater number of GPRs 218 or the shader 302 may be executed based on a simple branch 306 that requires a fewer number of GPRs 218 based on the determined value of the constants 206 by the GPR release mechanism 402. However, when a value of the constants 206 is determined to be a value that corresponds to execution of the simple branch 306, such that the complex branch 304 does not need to be executed, the GPRs 218 that are allocated to the shader 302 in excess of that required to execute the simple branch 306 may be deallocated from the shader 302 for a subsequent instance of execution. Thus, the GPR release mechanism 402 may be configured to increase the availability of GPRs 218 for use by other threads of the GPU that are external to the shader 302 to provide a more efficient allocation of GPR resources with the GPU by enabling more threads to be simultaneously resident.

Deallocation of GPRs 218 via the GPR release mechanism 402 may not apply to the preamble shader 224 (which is only executed once per draw call) or to a first instance of execution of the main shader 226, but may only apply to subsequent threads within the draw call that have not yet been issued or have not yet received a GPR allocation. Since the GPR release mechanism 402 is configured to modify GPR allocations for subsequent threads, approaches for releasing the GPRs 218 from the subsequent threads may be simplified in comparison to approaches for releasing the GPRs from a current thread that has already had the GPRs 218 allocated thereto. An exact time at which the GPRs 218 are to be deallocated for the subsequent threads may be of less importance in some cases, as earlier issued threads that execute with an excess GPR allocation will still execute correctly. As such, the GPR release mechanism 402 may be incorporated in either or both of the preamble shader 224 (e.g., to have the GPRs deallocated for all the threads of the draw call) and/or the main shader 226 (e.g., to have the GPRs deallocated for a subset of threads of the draw call, such as in configurations that do not utilize a preamble shader 224).

A command processor or other programmable hardware unit that has access to the constants 206 may be configured to perform similar operations to the GPR release mechanism 402. For example, the command processor may be configured to determine based on the constants 206 the number of GPRs 218 that are needed to execute the shader 302 before the shader 302 is launched by the command processor. The command processor may then cause the GPRs 218 to be allocated to the shader 302 based on the determined number of GPRs 218.

The preamble shader 224 and the main shader 226 may be compiled concurrently. The preamble shader 224 may be used for fetching constants 206 from memory and storing the constants 206 in a local constant buffer, where the constants 206 may be accessed more efficiently during the draw call. Because the constants 206 remain unchanged throughout the draw call, the preamble shader 224 provides a way for the constants 206 to be fetched once at the beginning of the draw call, rather than being fetched for each pixel by the main shader 226. While the preamble shader 224 may provide a benefit of managing local constant storage for purposes of accessing constants 206 more efficiently, the preamble shader 224 is not a requirement for implementation of the GPR release mechanism 402. For example, the compiler may instead compile the main shader 226 for fetching the constants 206 from memory, albeit on a per pixel basis rather than once per draw call. A determination may be made by the GPR release mechanism 402 of the main shader 226 for each of the individual pixels/threads regarding the number of GPRs 218 that are needed to execute the pixels/threads so that excess GPRs 218 may be deallocated for subsequent instances of shader execution within the draw call. Since the per pixel determinations are based on constants 206, the determined number of GPRs 218 for subsequent pixels/threads remain unchanged throughout the draw call. While the preamble shader 224 may allow the GPRs 218 to be deallocated as soon as execution of the main shader 226 begins, the GPR release mechanism 402 may similarly be executed by the main shader 402 after a first portion of the draw call is executed with a less efficient GPR allocation to provide a deallocation of excess GPRs/more efficient GPR allocation for executing a second portion of the draw call.

When the compiler generates the shader 302, a number of unique paths/branches through the shader 302 may be identified based on different possible constants 206 that may be input to a function of the shader 302. That is, the compiler may determine based on the function of the shader 302 and the different possible constants 206 a number of GPRs 218 that are to be allocated to the shader 302. The number of GPRs 218 determined by the compiler at compile time is typically flexible enough to satisfy even a most complex path/branch (e.g., complex branch 304) through the shader 302 based on the different possible constants 206. The preamble shader 224 may be a natural location to incorporate the GPR release mechanism 402 for determining a number of GPRs 218 needed for shader execution since deallocation of any unneeded GPRs 218 occurs at an initial execution time of the main shader 226. However, the GPR release mechanism 402 is not limited to incorporation within the preamble shader 224 for reducing the GPR allocation and thereby allowing more threads/pixels to be executed simultaneously, improving latency hiding, and/or increasing the efficiency of both the shader 302 and the system memory.

Figure 5:
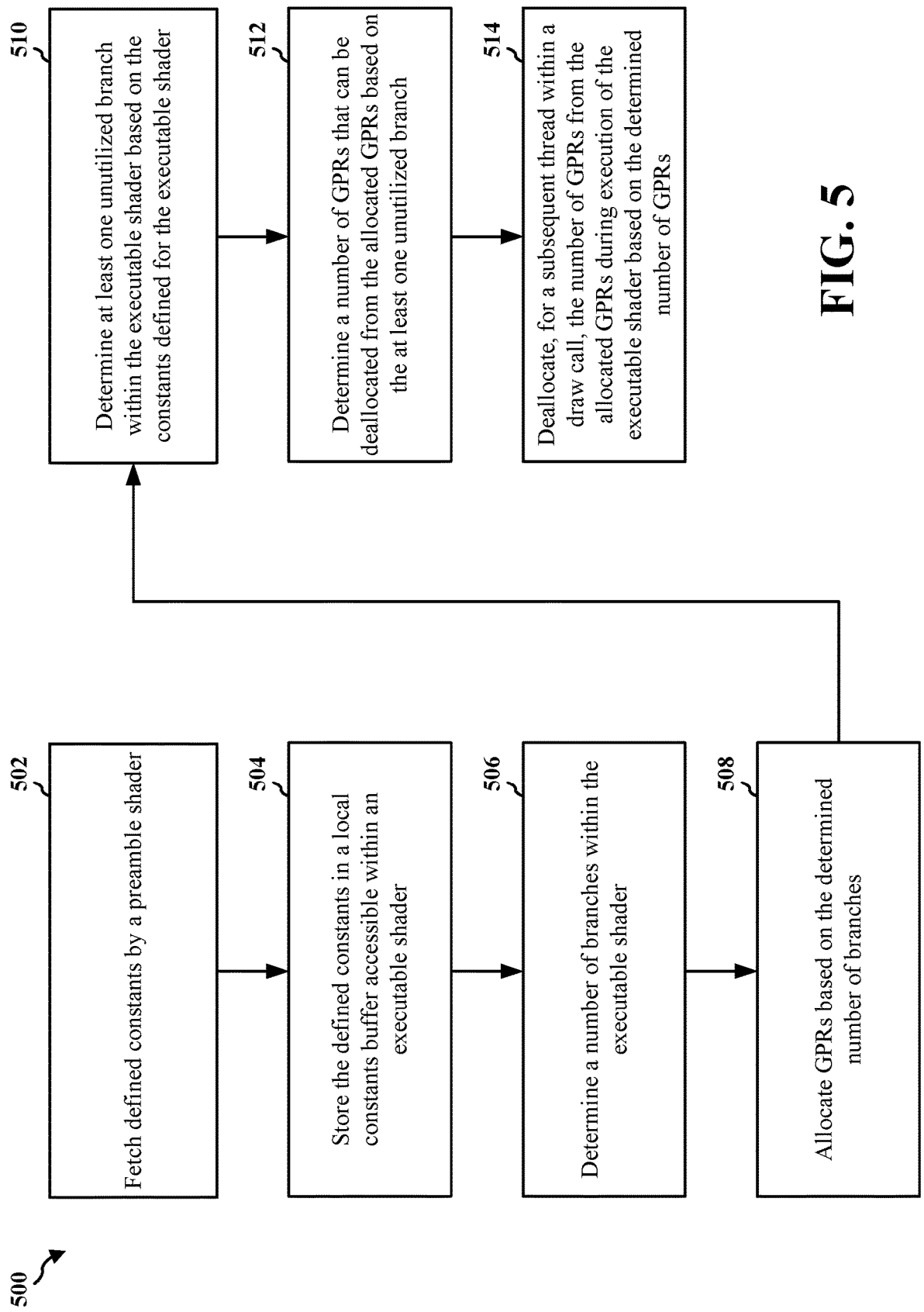
FIG. 5 is a flowchart of an example method in accordance with one or more techniques of this disclosure.

FIG. 5 is a flowchart of an example method 500 of GPR deallocation in accordance with one or more techniques of this disclosure. The method 500 may be performed by a GPU, a CPU, a command processor, an apparatus for graphics processing, a wireless communication device, and the like, as used in connection with the examples of FIGS. 1-4.

At 502, a preamble shader may fetch defined constants (e.g. to perform a method of GPR deallocation). For example, referring to FIG. 2, the preamble shader 224 executing on the shader core 216 may fetch the constants 206 from the graphics API 204. The method of GPR deallocation may be performed by the preamble shader within an executable shader and before a main portion of the executable shader when executed by a GPU. Additionally or alternatively, the method of GPR deallocation may be performed within the main portion of the executable shader when executed by the GPU and applied to subsequent invocations of the main portion of the executable shader within a draw call. For example, referring to FIG. 2, the preamble shader 224 and/or the main shader 226 may execute on the shader core 216 of the GPU 212 to perform the method of GPR deallocation. In further configurations, the method of GPR deallocation may be performed by a command processor within the GPU. For example, referring to FIG. 2, the command engine 214 may execute, on the GPU 212, commands from a command stream to perform the method of GPR deallocation.

At 504, the defined constants may be stored in a local constant buffer accessible within the executable shader. For example, referring to FIG. 2, the constants 206 may be stored in the constant memory 220 accessible to the shader core 216. In further aspects, the constants 206 may be stored in the GPU memory 222.

At 506, a number of branches within the executable shader may be determined.

For example, referring to FIG. 2, the number of branches may be determined by the GPU 212 based on different values of the constants 206 that may be used for execution of the preamble shader 224 and/or the main shader 226. The constants may be undefined at compilation of the executable shader. Therefore, the constants 206 that may be used by the executable shader may assume values that are undetermined by the shader compiler 208 at compilation time, but may be determined by the executable shader at runtime.

At 508, GPRs may be allocated based on the determined number of branches.

For example, referring to FIG. 2, the GPRs 218 may be allocated to the shader core 216 for executing branches of the preamble shader 224 and/or the main shader 226. When deallocation of the GPRs is to be performed, a number of GPRs may be deallocated from the allocated GPRs.

At 510, at least one unutilized branch within the executable shader may be determined based on the constants defined for the executable shader. For example, referring to FIG. 2, the constants 206 fetched by the preamble shader 224 or the main shader 226 may be used for determining at least one unutilized branch in the main shader 226.

At 512, the number of GPRs that can be deallocated from the allocated GPRs may be determined based on the at least one unutilized branch. For example, referring to FIG. 4, the instructions 400 indicate, for instance, that 16 GPRs may be deallocated from 20 allocated GPRs based on a local constant of 0 that is indicative of an unutilized branch. Determining the number of GPRs that can be deallocated based on the at least one unutilized branch may further include determining a total number of GPRs required for execution of the executable shader in an absence of the at least one unutilized branch; and determining the number of GPRs that can be deallocated based on the number of GPRs allocated in excess of the determined total number of GPRs. For example, referring to FIG. 4, the instructions 400 indicate that 4 GPRs may be required for execution of the executable shader in an absence of the complex branch. As such, the instructions 400 may determine that 16 GPRs of the 20 total allocated GPRs are in excess of the 4 required GPRs and may be deallocated.

At 514, the number of GPRs may be deallocated from the allocated GPRs, for a subsequent thread within a draw call, during execution of the executable shader based on the determined number of GPRs. For example, referring to FIG. 4, the instructions 400 indicate that, for a subsequent thread within a draw call, 16 GPRs may be deallocated from the 20 allocated GPRs during execution of the executable shader. In aspects, the number of GPRs may be deallocated before execution of the executable shader. For example, referring to FIG. 2, the GPRs 218 may be deallocated by the preamble shader 224 before execution of the main shader 226.

Figure 6:
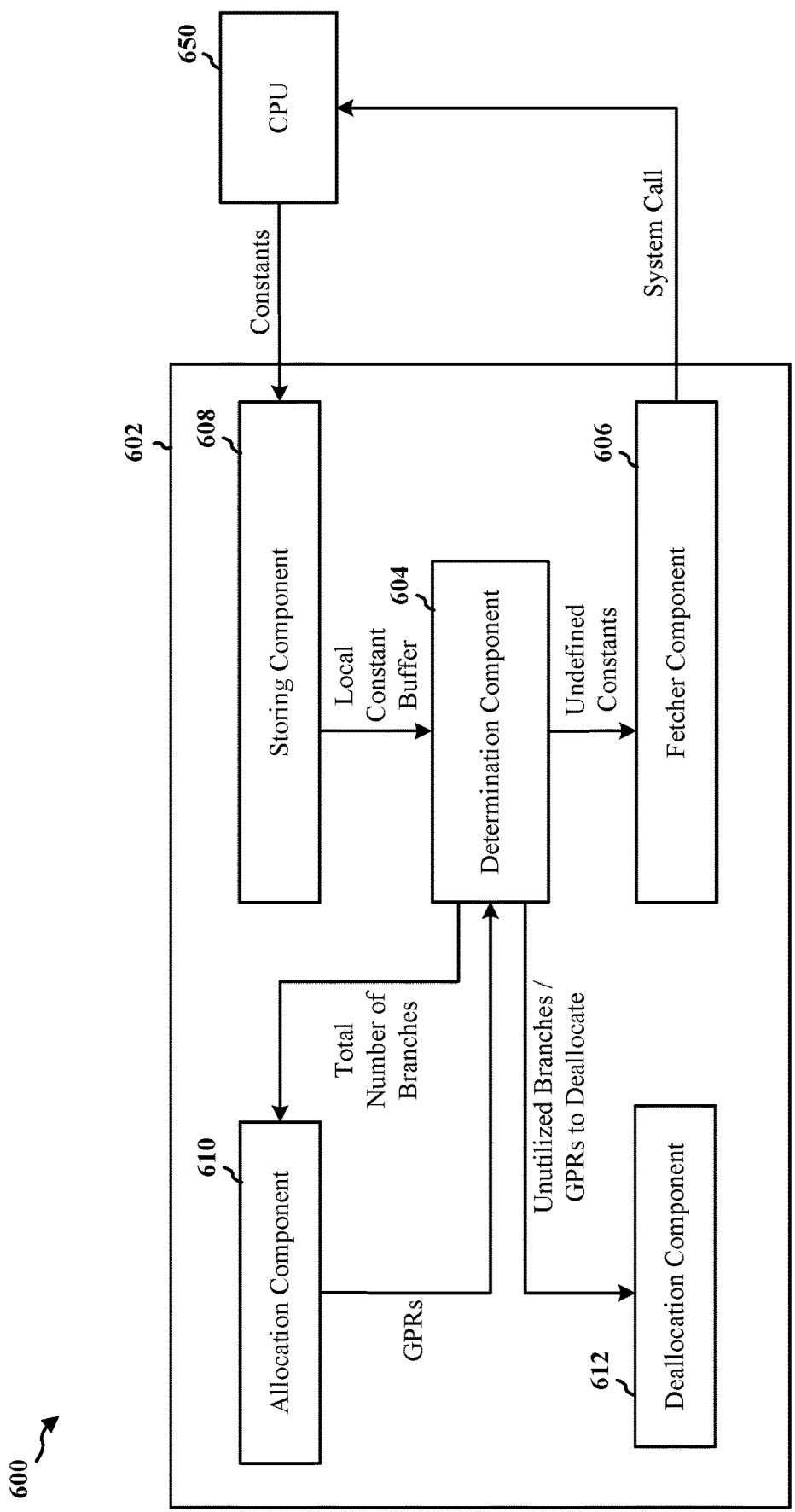
FIG. 6 is a conceptual data flow diagram illustrating the data flow between different means/components in an example apparatus.

FIG. 6 is a conceptual data flow diagram 600 illustrating the data flow between different means/components in an example apparatus 602. The apparatus 602 may be a GPU, a command processor, an apparatus having an executable shader, a wireless communication device, or other similar apparatus.

The apparatus 602 includes a determination component 604 that may determine, after compilation of an executable shader, that constants are undefined for branches of the executable shader. Based on the undefined constants, a fetcher component 606 included in the apparatus 602 executes a system call to fetch defined constants from a CPU 650. For example, as described in connection with 502, the fetcher component 606 may fetch defined constants via a preamble shader. The apparatus 602 includes a storing component 608 that receives the constants from the CPU 650 and stores the constants in a local constant buffer. For example, as described in connection with 504, the storing component 608 may store the defined constants in a local constant buffer accessible within an executable shader.

The determination component 604 may determine based on the constants retrieved from the local constant buffer a total number of branches within the executable shader. For example, as described in connection with 506, the determination component 604 may determine a number of branches within the executable shader. The apparatus 602 further includes an allocation component 610 that may allocate GPRs to the executable shader. For example, as described in connection with 508, the allocation component 610 may allocate GPRs based on the determined number of branches.

After receiving the allocated GPRs, the determination component 604 may determine unutilized branches of the executable shader and a number of the allocated GPRs to be deallocated based on the determined unutilized branches. For example, as described in connection with 510, the determination component 604 may determine at least one unutilized branch within the executable shader based on the constants defined for the executable shader. As described in connection with 512, the determination component 604 may further determine a number of the GPRs that can be deallocated from the allocated GPRs based on the at least one unutilized branch.

The apparatus 602 includes a deallocation component 612 that deallocates GPRs from the executable shader for a subsequent thread within a draw call. For example, as described in connection with 514, the deallocation component 612 may deallocate, for a subsequent thread within a draw call, the number of GPRs from the allocated GPRs during execution of the executable shader based on the determined number of GPRs.

The apparatus 602 may include additional components that perform each of the blocks of the algorithm in the aforementioned flowchart of FIG. 5. As such, each block in the aforementioned flowchart of FIG. 5 may be performed by a component and the apparatus 602 may include one or more of those components. The components may be one or more hardware components specifically configured to carry out the stated processes/algorithm, implemented by a processor (e.g., logic and/or code executed by a processor) configured to perform the stated processes/algorithm, stored within a computer-readable medium for implementation by a processor, or some combination thereof.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interrupted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

Computer-readable media may include computer data storage media or communication media including any medium that facilitates transfer of a computer program from one place to another. In this manner, computer-readable media generally may correspond to: (1) tangible computer-readable storage media, which is non-transitory; or (2) a communication medium such as a signal or carrier wave. Data storage media may be any available media that can be accessed by one or more computers or one or more processors to retrieve instructions, code, and/or data structures for implementation of the techniques described in this disclosure. By way of example, and not limitation, such computer-readable media can comprise RAM, ROM, EEPROM, compact disc-read only memory (CD-ROM), or other optical disk storage, magnetic disk storage, or other magnetic storage devices. Disk and disc, as used herein, includes compact disc (CD), laser disc, optical disc, digital versatile disc (DVD), floppy disk, and Blu-ray disc, where disks usually reproduce data magnetically, while discs usually reproduce data optically with lasers. Combinations of the above should also be included within the scope of computer-readable media. A computer program product may include a computer-readable medium.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques could be fully implemented in one or more circuits or logic elements.

Various examples have been described. These and other examples are within the scope of the following claims.

What is claimed is:

1. A method of general purpose register (GPR) deallocation, comprising:
   determining, on a draw call basis, for a draw call, at least one unutilized branch within a single executable shader based on constants defined for the single executable shader, the single executable shader comprising a plurality of branches including the at least one unutilized branch;
   determining a number of GPRs that can be deallocated from allocated GPRs based on the at least one unutilized branch; and
   deallocating, for a subsequent thread within the draw call, the number of GPRs from the allocated GPRs during execution of the single executable shader based on the determined number of GPRs.

2. The method of claim 1, wherein determining the number of GPRs that can be deallocated based on the at least one unutilized branch comprises:
   determining a total number of GPRs required for execution of the single executable shader in an absence of the at least one unutilized branch; and
   determining the number of GPRs that can be deallocated based on the number of GPRs allocated in excess of the determined total number of GPRs.

3. The method of claim 1, wherein the number of GPRs are deallocated before execution of the single executable shader.

4. The method of claim 1, wherein the method is performed by a preamble shader within the single executable shader and before a main portion of the single executable shader when executed by a graphics processing unit (GPU).

5. The method of claim 4, further comprising:
   fetching, by the preamble shader, the defined constants; and
   storing the defined constants in a local constants buffer accessible within the single executable shader.

6. The method of claim 1, wherein the method is performed within a main portion of the single executable shader when executed by a graphics processing unit (GPU) and applied to subsequent invocations of the main portion of the single executable shader within the draw call.

7. The method of claim 1, wherein the method is performed by a command processor within a graphics processing unit (GPU).

8. The method of claim 1, further comprising:
   determining a number of branches within the single executable shader; and
   allocating GPRs based on the determined number of branches, wherein the number of GPRs are deallocated from the allocated GPRs.

9. The method of claim 1, wherein the constants are undefined at compilation of the single executable shader.

10. An apparatus for general purpose register (GPR) deallocation, comprising:
    a memory; and at least one processor coupled to the memory and configured to:
- determine, on a draw call basis, for a draw call, at least one unutilized branch within a single executable shader based on constants defined for the single executable shader, the single executable shader comprising a plurality of branches including the at least one unutilized branch;
- determine a number of GPRs that can be deallocated from allocated GPRs based on the at least one unutilized branch; and
- deallocate, for a subsequent thread within the draw call, the number of GPRs from the allocated GPRs during execution of the single executable shader based on the determined number of GPRs.

11. The apparatus of claim 10, wherein the at least one processor configured to determine the number of GPRs that can be deallocated based on the at least one unutilized branch is further configured to:
- determine a total number of GPRs required for execution of the single executable shader in an absence of the at least one unutilized branch; and
- determine the number of GPRs that can be deallocated based on the number of GPRs allocated in excess of the determined total number of GPRs.

12. The apparatus of claim 10, wherein the number of GPRs are deallocated before execution of the single executable shader.

13. The apparatus of claim 10, wherein an act of the at least one processor is performed by a preamble shader within the single executable shader and before a main portion of the single executable shader when executed by a graphics processing unit (GPU).

14. The apparatus of claim 13, wherein the at least one processor is further configured to:
- fetch, by the preamble shader, the defined constants; and
- store the defined constants in a local constants buffer accessible within the single executable shader.

15. The apparatus of claim 10, wherein an act of the at least one processor is performed within a main portion of the single executable shader when executed by a graphics processing unit (GPU) and applied to subsequent invocations of the main portion of the single executable shader within the draw call.

16. The apparatus of claim 10, wherein an act of the at least one processor is performed by a command processor within a graphics processing unit (GPU).

17. The apparatus of claim 10, wherein the at least one processor is further configured to:
- determine a number of branches within the single executable shader; and
- allocate GPRs based on the determined number of branches, wherein the number of GPRs are deallocated from the allocated GPRs.

18. The apparatus of claim 10, wherein the constants are undefined at compilation of the single executable shader.

19. The apparatus of claim 10, wherein the apparatus is a wireless communication device.

20. A non-transitory computer-readable medium storing computer executable code, the code when executed by at least one processor, causes the at least one processor to:
- determine, on a draw call basis, for a draw call, at least one unutilized branch within a single executable shader based on constants defined for the single executable shader, the single executable shader comprising a plurality of branches including the at least one unutilized branch;
- determine a number of GPRs that can be deallocated from allocated GPRs based on the at least one unutilized branch; and
- deallocate the number of GPRs from the allocated GPRs during execution of the single executable shader within the draw call based on the determined number of GPRs.

* * * * *